United States Patent [19]
Berger

[11] 3,726,938
[45] Apr. 10, 1973

[54] OLEFIN PRODUCTION

[76] Inventor: Albert J. Berger, 16 Fairview Road, Loundonville, N.Y. 12211

[22] Filed: Nov. 16, 1971

[21] Appl. No.: 201,595

Related U.S. Application Data

[63] Continuation-in-part of Ser. No. 36,240, May 11, 1970, abandoned.

[52] U.S. Cl. .............................................. 260/683 D
[51] Int. Cl. ............................................... C07c 3/62
[58] Field of Search .................................. 260/683 D

[56] References Cited

UNITED STATES PATENTS

| | | | |
|---|---|---|---|
| 3,457,320 | 7/1969 | Stapp et al. | 260/683 |
| 3,491,163 | 1/1970 | Kenton et al. | 260/683 |
| 3,526,676 | 9/1970 | Turner et al. | 260/683 |
| 3,647,906 | 3/1972 | Farley | 260/683 |

Primary Examiner—Delbert E. Gantz
Assistant Examiner—C. E. Spresser
Attorney—Howard W. Haworth et al.

[57] ABSTRACT

Ethylene is converted to linear monoolefins of a selected range of carbon atoms by (1) oligomerizing ethylene to linear α-olefins (2) separating the linear α-olefins into a lower α-olefin fraction, and intermediate α-olefin fraction of a selected range of carbon atoms and a higher α-olefin fraction (3) recovering the intermediate α-olefin fraction as product (4) isomerizing and disproportionating at least a portion of the lower and higher α-olefin fractions to a mixture of monoolefins (5) separating the mixture of monoolefins into a lower monoolefin fraction, an intermediate monoolefin fraction of a selected range of carbon atoms and a higher monoolefin fraction (6) recovering the second intermediate monoolefin fraction as product, and (7) recycling at least a portion of the lower and higher monoolefin fractions for further isomerization and disproportionation.

8 Claims, 1 Drawing Figure

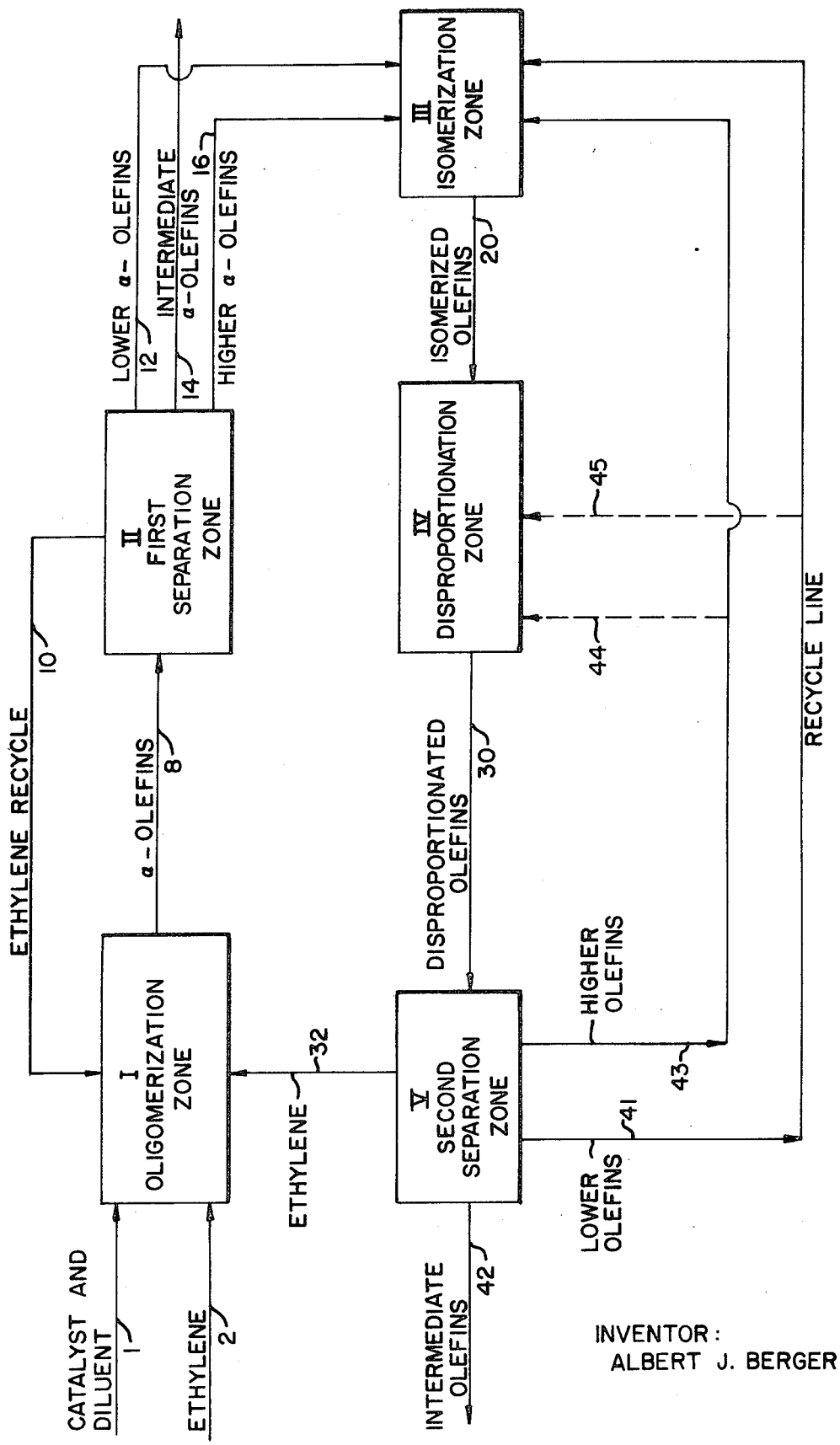

OLEFIN PRODUCTION

This application is a continuation-in-part of copending application U.S. Ser. No. 36,240, filed May 11, 1970 now abandoned.

BACKGROUND OF THE INVENTION

Linear monoolefins are compounds of established utility in a variety of applications. Terminal linear monoolefins, particularly $C_{14}$-$C_{20}$, are converted to olefin sulfonates, e.g., as by treatment with sulfur trioxide, which are useful as biodegradable detergents. Alternatively, such olefins are converted to alcohols by conventional "Oxo" processes or sulfuric acid catalyzed hydration. The $C_{14}$-$C_{20}$ alcohols thus produced are ethoxylated with ethylene oxide in the presence of a basic catalyst, e.g., sodium hydroxide, to form conventional detergents and lower molecular weight alcohols are esterified with polyhydric acids, e.g., phthalic acid, to form plasticizers for polyvinyl chloride.

It is known that ethylene can be oligomerized to higher molecular weight linear monoolefins in the presence of certain organometallic catalysts, e.g., Ziegler-type catalysts such as aluminum trialkyls. Although such catalytic ethylene oligomerization processes have been known for many years, they have not been widely utilized in commerce. One major reason for this lack of commercial utility is the difficulty of directing the catalytic oligomerization to produce a product fraction of controlled and specific molecular weight range.

SUMMARY OF THE INVENTION

It has now been found that linear monoolefins of selected carbon atom ranges can be produced from ethylene in an improved, cyclic-type, integrated process which comprises the steps of (1) oligomerizing ethylene to a mixture of linear α-olefins with an ethylene oligomerization catalyst (2) separating the linear α-olefins into a lower α-olefin fraction, an intermediate α-olefin fraction of a selected range of carbon atoms, and a higher α-olefin fraction (3) recovering the intermediate α-olefin fraction as product (4) isomerizing at least a portion of the lower and higher α-olefin fractions to internal olefins with a double bond isomerization catalyst (5) disproportionating the internal olefins with an olefin disproportionation cayalyst to produce a product mixture containing monoolefins of a second selected range of carbon atoms (6) separating the disproportionation product mixture into a second lower fraction of monoolefins, a second intermediate fraction of monoolefins of a second selected range of carbon atoms and a second higher monoolefin fraction (7) recovering the second intermediate fraction of monoolefins as products, and (8) recycling at least a portion of the second lower and higher monoolefin fractions to steps (4) or (5). By the process of the invention, ethylene is converted to linear monoolefins of controlled and specific molecular weight ranges.

BRIEF DESCRIPTION OF DRAWING

The sole FIGURE of the drawing is a schematic flow diagram of a preferred embodiment of the invention. In the drawing, I designates an oligomerization zone, II a first separation zone, III an isomerization zone, IV a disproportionation zone, and V a second separation zone. For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

With reference to the drawing, one modification of the process may be summarized as follows. The oligomerization catalyst or catalyst components and reaction diluent are charged through line 1 and ethylene is introduced through line 2 to the oligomerization zone I, maintained at desired reaction conditions of temperature and pressure. The resulting reaction mixture comprising $C_4$-$C_{20}$ α-olefins is removed through line 8 to the separation zone II wherein unreacted ethylene is separated and recycled through line 10. In the separation zone II, such as a fractional distillation zone, the $C_4$-$C_{20}$ α-olefin products are separated into a lower α-olefin fraction, e.g., $C_4$-$C_{10}$, an intermediate α-olefin fraction, e.g., $C_{12}$-$C_{20}$ and a higher α-olefin fraction, e.g., $C_{22}$+. The intermediate α-olefin fraction is recovered as product through line 14. At least a portion of the lower α-olefin fraction from line 12 and the higher α-olefin fraction from line 16 are passed to isomerization zone III. The isomerized lower and higher internal olefins from the isomerization zone are passed through line 20 to the disproportionation zone IV, wherein the isomerized mixture is disproportionated to produce an olefin product mixture containing intermediate olefins. The olefin mixture from the disproportionation zone is passed through line 30 to the second separation zone V wherein the olefin mixture is separated into a lower olefin fraction ($C_{10}$−), an intermediate olefin fraction, ($C_{11}$-$C_4$), and a higher olefin fraction $C_{15}$+). the intermediate olefins are recovered through line 42 as products. The higher olefin fraction from line 43 is recycled to the isomerization zone. Optionally, at least a portion of the lower and higher olefin fractions may be recycled directly through lines 44 and 45 to the disproportionation zone. Any ethylene produced in the disproportionation zone is separated in the separation zone and recycled to the oligomerization zone through line 32.

By the use of this integrated, cyclic process, ethylene is converted to linear $C_{12}$-$C_{20}$ α-monoolefins and linear $C_{11}$-$C_{14}$ monoolefins.

DESCRIPTION OF PREFERRED EMBODIMENTS

OLIGOMERIZATION ZONE

In the oligomerization zone I, ethylene is converted to a mixture of linear α-olefins in the presence of a variety of ethylene oligomerization catalysts. Although the distribution of the linear α-olefin mixture will depend in part upon the particular ethylene oligomerization catalyst employed, the mixture of linear α-olefins comprises $C_4$ to $C_{60}$ α-olefins, although a major portion of the mixture preferably consists essentially of $C_4$ to $C_{40}$ α-olefins.

One suitable class of ethylene oligomerization catalysts are Ziegler-type catalysts, i.e., compounds of metals such as alkali metals (e.g., lithium, sodium, potassium), alkaline earth metals such as beryllium and magnesium and Group III metals such as aluminum, gallium and indium. Suitable Ziegler-type catalysts and ethylene oligomerization reaction conditions are those described in U.S. Pat. No. 2,699,457, issued Jan. 11, 1955 to Ziegler et al., U.S. Pat. No. 3,310,600, issued Mar. 21, 1967, to Ziegler et al. and U.S. Pat. No. 3,478,124, issued Nov. 11, 1969, to Fernald et al., and U.S. Pat. No. 3,482,000, issued Dec. 2, 1969, to Fernald et al. Preferred Ziegler-type oligomerization catalysts are aluminum trialkyls.

Another class of suitable ethylene oligomerization catalysts are nickel complexes of certain phosphorus-containing ligands, including those described in copending application U.S. Ser. No. 874,377, of Keim et al., common assignee, filed Nov. 5, 1969, now abandoned and U.S. Ser. No. 874,058 of Bauer et al., common assignee, filed Nov. 4, 1969, now U.S. Pat. No. 3,647,914. Ser. No. 874,377 discloses the oligomerization of ethylene with nickel chelates of bidentate ligands having a tertiary organophosphorus moiety and a carboxymethyl or carboxyethyl group attached directly to the phosphorus atom of the organophosphorus moiety (e.g., a nickel chelate of diphenylcarboxymethylphosphine). Ser. No. 874,058, now U.S. Pat. No. 3,647,914, discloses the oligomerization of ethylene with nickel chelates of bidentate ligands having a tertiary organophosphorus moiety and a functional group selected from hydroxymethyl, mercaptomethyl, hydrocarboyl and hydrocarbyloxycarbonyl substituted on a carbon atom attached directly to the phosphorus atom of the organophosphorus moiety (e.g. a nickel chelate of diphenylhydroxymethylphosphine).

FIRST SEPARATION ZONE

The $\alpha$-olefin product mixture from the oligomerization zone is passed to the first separation zone II. The separation zone II may comprise a suitable fractionation unit or similar conventional separation apparatus. Any unreacted ethylene and diluent are suitable for recycle to the oligomerization zone I. The $\alpha$-olefins are separated into a lower $\alpha$-olefin fraction, an intermediate $\alpha$-olefin fraction of a selected range of carbon atoms, e.g., $C_8$ to $C_{24}$, and a higher $\alpha$-olefin fraction. The range of carbon atoms of the intermediate $\alpha$-olefin fraction can be any range desired. Useful ranges are from about 2 carbon-numbers to 10 carbon-numbers, e.g., $C_8$–$C_{10}$, $C_8$–$C_{12}$, $C_8$–$C_{14}$, $C_8$–$C_{16}$, $C_{10}$–$C_{12}$, $C_{10}$–$C_{14}$, $C_{10}$–$C_{16}$, $C_{10}$–$C_{20}$, $C_{12}$–$C_{16}$, $C_{12}$–$C_{20}$, $C_{14}$–$C_{20}$, $C_{20}$–$C_{24}$, and the like. The lower $\alpha$-olefin fraction may include from 1-butene up to $\alpha$-olefins having the same carbon-number as the lowest $\alpha$-olefin in the intermediate $\alpha$-olefin fraction, but preferably contains only $\alpha$-olefins of carbon-numbers lower than the carbon-number of the lowest $\alpha$-olefin in the intermediate $\alpha$-olefin fraction. In certain modifications wherein a lower $\alpha$-olefin fraction free of light ends (e.g., 1-butene or 1-butene and 1-hexene) is desired, light ends are separated and recovered as product in the separation zone, and the higher boiling portion of the lower $\alpha$-olefin fraction is passed to the isomerization zone. The higher $\alpha$-olefin fraction may include $\alpha$-olefins of the same carbon number as the highest $\alpha$-olefin in the intermediate $\alpha$-olefin fraction up to the highest $\alpha$-olefins produced in the oligomerization reaction, but generally not higher than $C_{40}$. Preferably, however, the higher $\alpha$-olefin fraction contains only $\alpha$-olefins of carbon numbers higher than the carbon number of the highest $\alpha$-olefin in the intermediate $\alpha$-olefin fraction.

ISOMERIZATION ZONE

In the isomerization zone the lower and higher $\alpha$-olefins are converted to internal olefins by double-bond isomerization. The isomerization can be conducted by any more of less conventional procedure, either liquid or gas phase, with a wide variety of isomerization catalysts. The lower and higher olefins are suitably combined and isomerized in the same reactor or are isomerized in separate reactors. The $\alpha$-olefins are generally isomerized to at least 70 percent internal olefins, and occasionally at least 90 percent internal olefins. Preferred catalysts are those which have little or no polymerization or cracking activity. Some examples of suitable isomerization catalysts include supported phosphoric acid, bauxite, alumina supported cobalt oxide or iron oxide or manganese oxide, and the like. Suitable catalysts can be selected from among those available in the art, such as the double-bond isomerization catalysts tabulated by H. N. Dunning in *Review of Olefin Isomerization, Ind. and Eng. Chem.*, 45, 551 (1953).

DISPROPORTIONATION ZONE

In the disproportionation zone, at least a portion of the lower and higher internal olefins are converted to olefin(s) of the desired range of carbon atoms. By way of illustration, a lower olefins such as 2-butene and a higher olefin such as 15-triacontene are disproportionated into two molecules of intermediate molecular weight olefins, e.g., 2-heptadecene. Similarly, 2-butene and 4-tricosene are converted to 2-hexene and 2-heneicosene ($C_{21}$) olefins of molecular weight intermediate between 2-butene and 4-tricosene. Although unisomerized $\alpha$-olefins are also present in the disproportionation zone, the isomerized internal olefins generally undergo disproportionation at more rapid rates.

The disproportionation reaction can be conducted by any more or less conventional procedure. A description of suitable catalysts and reaction conditions is given in an extensive review article by G. C. Bailey in *Catalysis Reviews* 3(1), 37–60 (1969). Illustrative heterogeneous disproportionation catalysts include oxides of molybdenum and tungsten supported on inorganic carriers such as alumina or silica. Illustrative homogeneous catalysts include molybdenum or tungsten compounds in combination with organoaluminum compounds, as disclosed in U.S. Pat. No. 3,492,245 and U.S. Pat. No. 3,535,401 of Calderon et al.

In an embodiment of the process, the isomerization of the olefins and the disproportionation of the resulting isomerized olefins are carried out concurrently in a single reaction zone. Catalyts suitably used for the simultaneous isomerization and disproportionation are disclosed in Netherlands Pat. application No. 6,804,601, of Phillips Petroleum, Netherlands Pat. application No. 6,818,762 of British Petroleum and Netherlands Pat. application No. 6,900,368 of Imperial Chemicals Industries. Preferred isomerization/disproportionation catalysts are $MoO_3/CoO/MgO$-on-alumina and $Re_2O_7/K_2O$-on-alumina.

SECOND SEPARATION ZONE

In the second separation zone the disproportionation product mixture is separated into a lower monoolefin fraction, an intermediate monoolefin fraction of a selected range of carbon atoms and a higher monoolefin fraction. The range of carbon atoms may be the same as the range of carbon atoms selected for the $\alpha$-olefin fraction separated in the first separation zone, but may also be any other suitable range desired. For example, useful ranges are from about 2 carbon-numbers to 10 carbon atoms, e.g., $C_8$–$C_{10}$, $C_{10}$–$C_{13}$, $C_{11}$–$C_{14}$, $C_{11}$–$C_{15}$, $C_{11}$–$C_{20}$, $C_{12}$–$C_{17}$, and $C_{12}$–$C_{20}$. It should be appreciated, however, that the olefin products from the disproportionation zone contain both even and odd number of carbon atoms, whereas only even carbon number olefins are produced in the ethylene oligomerization.

In certain modifications of the process wherein the lowest carbon number of the selected range of carbon atoms of the second intermediate monoolefin fraction is at least about $C_{10}$, a higher proportion of monoolefins in the selected range is obtained by removing the lower boiling $\alpha$-olefins (e.g., $C_4$ and $C_6$) from the lower $\alpha$-olefin fraction prior to contact in the disproportionation zone. The lower boiling olefins removed from the lower $\alpha$-olefin fraction are recovered as products. In these modifications, light ends are also suitably removed from the second lower monoolefin fraction prior to contact in the isomerization or disproportionation zone.

EXAMPLE I

OLIGOMERIZATION

An oligomerization catalyst is prepared by contacting 1.71 millimoles of bis-1,5-cyclooctadienenickel(0) and 1.71 millimoles of diphenylcarboxymethylphosphine in 90 ml of benzene at 25° C. The resulting benzene catalyst solution is then contacted with ethylene maintained at a constant pressure of 550 psig in a stirred autoclave for 4 hours at 75° C. Ethylene oligomers are produced at a rate of 76.7 grams per gram-atom of nickel per hour. The distribution of oligomers is as follows. 13.8% wt $C_4$, 14.5% wt $C_6$, 13.5% wt $C_8$, 11.89% wt $C_{10}$, 10.0% wt $C_{12}$, 8.1% wt $C_{14}$, 5.1% wt $C_{68}$, 4.0% wt $C_{20}$ and 12.5% wt $C_{22}$+.

In a similar manner a mixture of linear $\alpha$-olefin oligomers can be prepared by ethylene oligomerization with a Zeigler-type catalyst such as triethylaluminum.

ISOMERIZATION OF LOWER AND HIGHER OLEFIN FRACTIONS, FOLLOWED BY DISPROPORTIONATION

The $C_4$–$C_{10}$ fraction and the $C_{22}$+ fraction of the oligomers obtained after separation of the $C_{12}$–$C_{20}$ fraction are combined and isomerized to about 90 percent internal olefins in the presence of magnesium oxide granules (30–50 mesh) in liquid phase at 200° C. The isomerized olefins are then contacted in the presence of a $Re_2O_7$-on-alumina disproportionation catalyst (20% wt $Re_2O_7$, activated at 570° C for 1 hour) in a stirred autoclave at 140° C for 1 hour. The distribution of products obtained is as follows. 0.5% wt $C_3$, 13.4% wt $C_4$, 6.1% wt $C_5$, 13.9% wt $C_6$, 5.5% wt $C_7$, 11.7% wt $C_8$, 3.7% wt $C_9$, 8.8% wt $C_{11}$, 3.9% wt $C_{12}$, 2.6% wt $C_{13}$, 2.1% wt $C_{14}$, 1.7% wt $C_{15}$, 1.6% wt $C_{17}$, 1.8% wt $C_{16}$, 1.8% wt $C_{19}$, 2.0% wt $C_{20}$, 0.6% wt $C_{21}$, and balance $C_{22}$+.

EXAMPLE II

Isomerization of a Mixture of n-Hexenes, n-Octenes and n-Decenes

A hydrogen-containing gaseous mixture of n-1-hexene, n-1-octene and n-1-decene (molar ratio 1:3/4:9/16 was passed through a catalyst bed at atmospheric pressure (alkenes/hydrogen molar ratio 6/1) and a gas space velocity of 4.2 kg of alkenes per kg of catalyst per hour, which catalyst bed comprised gamma-alumina with a particle size of between 0.25 and 0.6 mm, a specific surface area of 350 m²/g and a pore volume of 0.47 ml/g. The temperature of the bed was kept at 330° C. The hydrocarbons in the gas mixture carried off from the bed was condensed and the composition of the condensate is presented in Table A, expressed in %m.

TABLE A

|  | $\alpha$-alkene | $\beta$-alkene | gamma-alkene | delta-alkene | eta-alkene |
|---|---|---|---|---|---|
| n-hexenes | 6 | 62 | 32 | — | — |
| n-octenes | 5 | 36 | 38 | 21 | — |
| n-decenes | 4 | 28 | 30 | 26 | 12 |

B. Isomerization of a Mixture of n-Alkenes Having 20, 22, 24, 26, 28 and 30 C-Atoms A mixture of 3.5% of n-1-$C_{20}H_{40}$, 36.2% of n-1-$C_{22}H_{44}$, 33.7% of n-1-$C_{24}H_{48}$, 19.5% of n-1-$C_{26}H_{52}$, 6.6% of n-1-$C_{26}H_{56}$ and 0.5% of 1-$C_{30}H_{60}$ (%m) was stirred intensively in a nitrogen environment at 300° C, with 0.5%w metallic sodium and 0.2%w of 2-chloro-1,4-dimethylbenzene for 3 hours.

After filtration of the reaction mixture the yield of isomerized n-alkenes, calculated on the starting mixture, was 100 percent.

C. Disproportionation

Two parts by weight of the mixture of n-hexenes, n-octenes and n-decenes prepared according to Example II (a), and one part by weight of the mixture of n-alkenes having 20–30 carbon atoms and monochlorobenzene prepared according to Example II (b) (chlorobenzene/alkenes volume ratio 4/3) were put into a round-bottomed flask. The two mixtures were disproportionated for three minutes in a homogeneous liquid environment at atmospheric pressure and 20° C under nitrogen by addition of $WCl_6$ (alkenes/$WCl_6$ molar ratio 5000/9) acetic acid and subsequently ethylaluminum dichloride ($WCl_6$/acetic acid/$C_2H_5$ $AlCl_2$ molar ratio 1 1/2 4). The disproportionation was carried out with intensive stirring. The mixture obtained after disproportionation was distilled, which gave a yield of 19.9%w of n-$C_{11}$-$C_{14}$ alkenes.

I claim as my invention

1. A process of converting ethylene to linear monoolefins of selected ranges of carbon atoms by,
  1. oligomerizing ethylene to a mixture of even-carbon-number linear $\alpha$-olefins of from about four to 60 carbon atoms in the presence of an ethylene oligomerization catalyst in a first reaction zone,
  2. separating in a separation zone the mixture of $\alpha$-olefins into a lower $\alpha$-olefin fraction, an intermediate $\alpha$-olefin fraction of a first selected range of carbon atoms and a higher $\alpha$-olefin fraction, 3. recovering the intermediate α-olefin fraction of the first selected range of carbon atoms as product,
4. isomerizing in a second reaction zone at least the higher-boiling portion of the lower α-olefin fraction and the higher α-olefin fraction to internal olefins in the presence of an isomerization catalyst,
5. disproportionating in a third reaction zone said internal olefins to a second mixture of monoolefins in the presence of a disproportionation catalyst,
6. separating in second separation zone the second mixture of monoolefins into a second lower monoolefin fraction, a second intermediate monoolefin fraction of a second selected range of carbon atoms and a second higher monoolefin fraction,
7. recovering the second intermediate monoolefin fraction as product, and
8. recycling to the second reaction zone or third reaction zone at least the higher boiling portion of the second lower monoolefin fraction and the second higher monoolefin fraction.

2. The process of claim 1 wherein the first and second selected ranges of carbon atoms are from about two carbon-numbers to 10 carbon-numbers.

3. The process of claim 2 wherein the first selected range of carbon atoms is about $C_{12}$–$C_{20}$.

4. The process of claim 3 wherein the second selected range of carbon atoms is about $C_{11}$–$C_{14}$.

5. The process of claim 3 wherein the lower α-olefin fraction employed in step (4) is essentially free of $C_4$ α-olefin.

6. The process of claim 5 wherein the second selected range of carbon atoms is about $C_{11}$–$C_{14}$.

7. The process of claim 5 wherein the second lower monoolefin fraction employed in step (4) or step (5) is essentially free of $C_4$ monoolefins.

8. The process of claim 1 wherein steps (4) and (5) are conducted concurrently in a single reaction zone with a combined isomerization/disproportionation catalyst.

* * * * *

UNITED STATES PATENT OFFICE
CERTIFICATE OF CORRECTION

Patent No. 3,726,938　　　　　　　　　Dated April 10, 1973

Inventor(s) ALBERT J. BERGER

It is certified that error appears in the above-identified patent and that said Letters Patent are hereby corrected as shown below:

In the heading of the patent, insert -- Application made under Rule 47 -- .

Signed and sealed this 25th day of December 1973.

(SEAL)
Attest:

EDWARD M. FLETCHER, JR.　　　　　RENE D. TEGTMEYER
Attesting Officer　　　　　　　　　Acting Commissioner of Patents